United States Patent [19]

Schmidt et al.

[11] Patent Number: 5,444,255

[45] Date of Patent: Aug. 22, 1995

[54] GAS DETECTOR FOR X-RADIATION

[75] Inventors: Martin Schmidt, Emskirchen; Claus Pohan, Baiersdorf, both of Germany

[73] Assignee: Siemens Aktiengesellschaft, Munich, Germany

[21] Appl. No.: 303,641

[22] Filed: Sep. 9, 1994

[30] Foreign Application Priority Data

Dec. 15, 1993 [DE] Germany .......................... 43 42 779.0

[51] Int. Cl.⁶ .................... G01T 1/185; G01T 1/29
[52] U.S. Cl. .................................................. 250/385.1
[58] Field of Search ............................. 250/374, 385.1

[56] References Cited

U.S. PATENT DOCUMENTS

| | | |
|---|---|---|
| 4,029,963 | 6/1977 | Alvarez et al. . |
| 4,055,767 | 10/1977 | Allemand . |
| 4,161,655 | 7/1979 | Cotic et al. ........................ 250/385.1 |
| 4,306,155 | 12/1981 | Cotic . |
| 4,367,409 | 1/1983 | Klausz ............................. 250/385.1 |
| 5,013,921 | 5/1991 | Bruening et al. . |

FOREIGN PATENT DOCUMENTS 4035696  5/1992  Germany .

OTHER PUBLICATIONS

Fenster, "Split Xenon Detector for Tomochemistry", J. Comput. Assist. Tomogr., vol. 2, No. 3, 1978, pp. 244–252.

*Primary Examiner*—Carolyn E. Fields
*Assistant Examiner*—Edward J. Glick
*Attorney, Agent, or Firm*—Hill, Steadman & Simpson

[57] ABSTRACT

In an x-ray detector of the type employing a gas-filled chamber containing a number of electrode plates for detecting ionization event caused by the interaction of x-ray photons with the gas, a number of detector cells are formed, each detector cell containing two electrode plates disposed in a plane in succession in the direction of propagation of an incoming x-ray beam. In order to permit the acquisition of different spectral ranges, the electrical signals from the electrode plates are respectively conducted out of the chamber. The electrode plates are plugged into spring contacts and are connected group-by-group to a conductor foil. Each conductor run within the conductor foil has a contact projection for making electrical contact between the conductor foil and a printed circuit board, which carries electronic components for processing the detector singles.

1 Claim, 2 Drawing Sheets

GAS DETECTOR FOR X-RADIATION

BACKGROUND OF THE INVENTION

1. Field of the Invention

The present invention is directed to a detector for x-rays, and specifically to x-ray detector of the type having a gas-filled chamber containing electrodes for registering ionization events arising due to the interaction of x-rays with the gas in the chamber.

2. Description of the Prior Art

For detecting x-rays and for generating electrical signals corresponding to the detected radiation, it is known to employ gas detectors in computer tomography. Such known gas detectors have a gas-tight chamber containing a plurality of electrodes as described, for example, in German PS 31 13 305, corresponding to United States U.S. Pat. No. 4,306,155, and German OS 40 35 696. In known radiation detectors of this type, a printed circuit board is provided for electrically connecting evaluation electronics to the measurement channels. German OS 27 33 586, corresponding to U.S. Pat. No. 4,029,963, discloses a gas-filled radiation detector for computer tomography wherein wires are employed as the electrodes disposed in the gas-tight chamber. Two wires, which are insulated from each other, are disposed in succession in the chamber in the radiation propagation direction for acquiring x-rays in different spectral ranges.

SUMMARY OF THE INVENTION

It is an object of the present invention to provide a radiation detector for computer tomography of the type described above, employing electrodes disposed in a gas-filled chamber, having a structure and an arrangement of components which makes the detector easy to assemble and easy to service.

The above object is achieved in a radiation detector constructed in accordance with the principles of the present invention having a plurality of detector cells contained in a gas-tight chamber, each electrode cell being formed by two electrode plates disposed in a plane in the radiation propagation direction, the signals from each electrode plate being conducted out of the chamber in order to register different spectral ranges of the incoming radiation. The electrode plates are plugged into spring contacts for tapping the signals therefrom, the spring contacts being connected group-by-group to a conductor foil. A common conductor foil is provided for the two electrode plates in each detector cell. The conductor foil is provided with contact projections ("nubs") for making electrical contact with terminal pads of a printed circuit board, which carries electrical components for processing the detector signals.

In the radiation detector of the invention, the electrical signals from the respective electrode plates in each detector cell can be processed separately or in common (as in conventional radiation detectors of this type). By arranging the electrode plates in slots formed by two retaining members in the chamber, an easy removal and insertion of the electrode plates is possible by means of the spring contacts. Given the use of a particularly thin electrode plate, for increasing the quantum efficiency, such plates are rigidly fixed, for example by gluing, in order to minimize or avoid the microphonic effect. The use of a single conductive foil for each of the two electrode plates disposed in succession in the beam propagation direction simplifies the structure even more. The electrode plates which are connected to a conductor foil can be combined in groups of, for example, sixteen plates.

DESCRIPTION OF THE PREFERRED EMBODIMENTS

Figure 1:
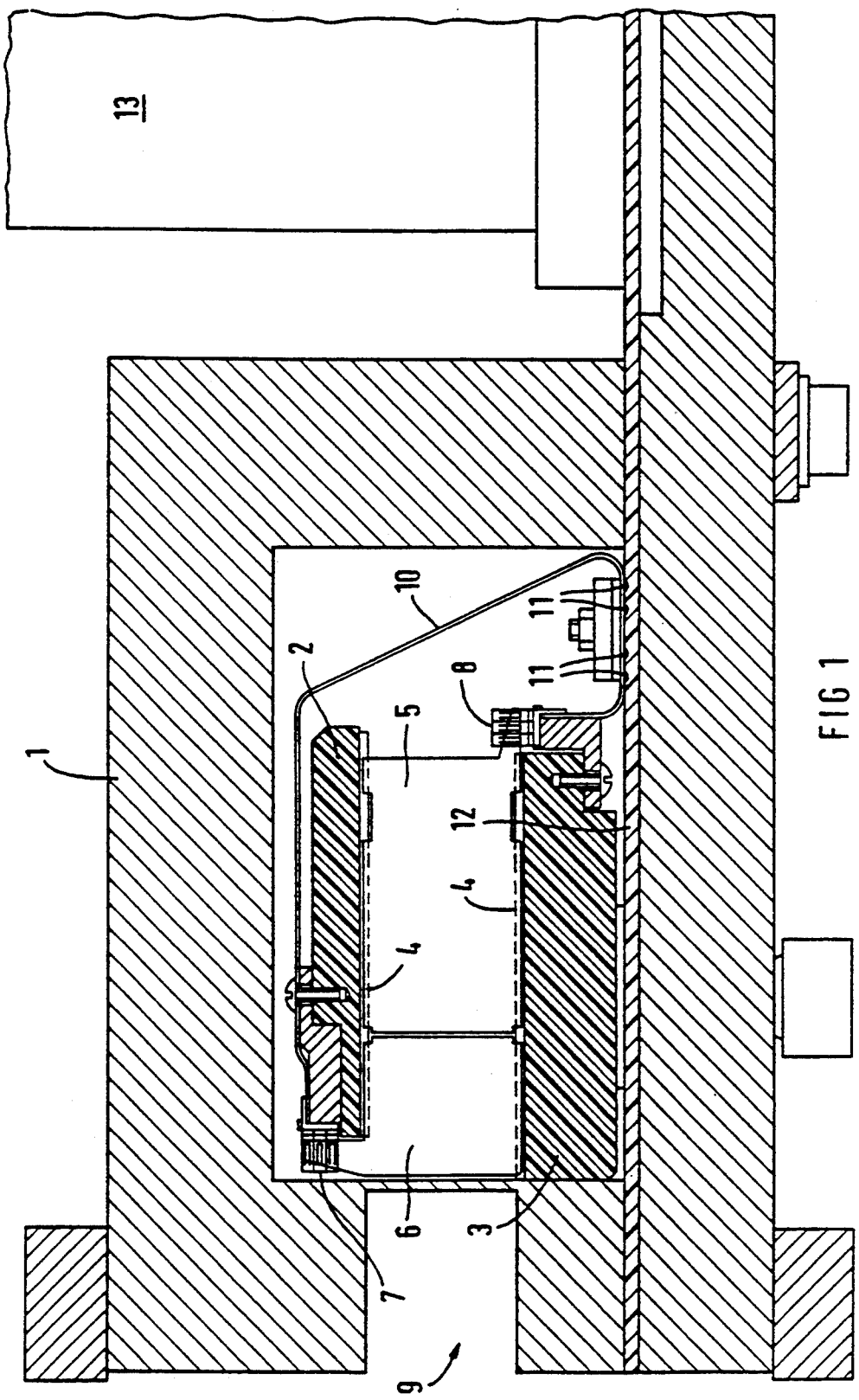
FIG. 1 is a cross sectional view of a radiation detector constructed in accordance with the principles of the present invention.

The radiation detector constructed in accordance with the principles of the present invention shown in FIG. 1 includes a gas-tight chamber 1 filled, for example, with xenon, and containing two retaining members 2 and 3 each having a longitudinal slots for therein, the slots 4 being in registry, into which electrode plates are plugged. In the embodiment shown in FIG. 1, two electrode plates 5 and 6, disposed in succession in the propagation direction of incoming radiation are visible. The plates 5 and 6 are disposed in one plane and are electrically contacted by respective spring contacts 7 and 8. The incoming x-rays enter through a window 9.

The spring contacts 7 and 8 are both connected to a flexible conductor foil having plurality of conductor runs, each conductor run having a small conductive projection 11, which is pressed against a terminal pad of a printed circuit board 12, making electrical contact therewith. The printed circuit board 12 is introduced gas-tight into the chamber 1 and has a portion extending outside of the chamber 1. The printed circuit board 12 carries electrical components 13 for processing the detector signals at the portion of the printed circuit board 12 disposed outside of the chamber 1.

Signals corresponding to different spectral ranges of the incoming x-rays are formed by the electrode plates 5 and 6 detecting ionization events in the chamber 1 by virtue of the x-ray photons interacting with the gas contained in the chamber 1.

Figure 2:
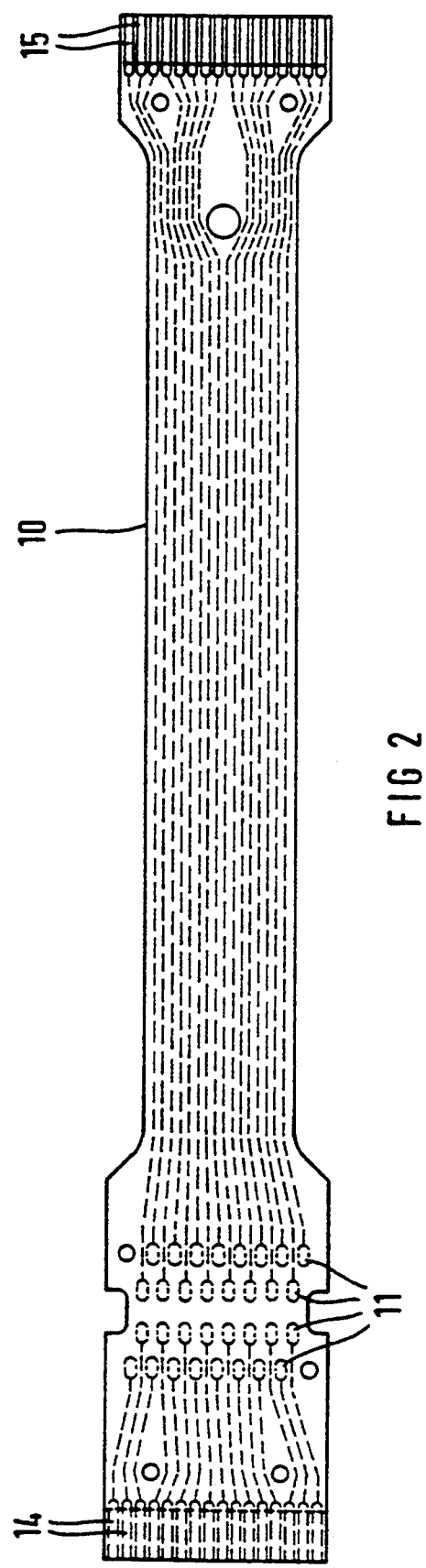
FIG. 2 shows a plan view of a conductor foil for use in the radiation detector of FIG. 1.

The conductor foil 10 is shown in FIG. 2 stretched flat, in a plan view. The conductor foil 10 has solder pads 14 at its left end, which are connected to the spring contacts 8, and solder pads 15 at its right end which are connected to the spring contacts 7. The conductive projections 11 for making electrical contact with the circuit board 12 are also visible in FIG. 2.

Although modifications and changes may be suggested by those skilled in the art, it is the intention of the inventor to embody within the patent warranted hereon all changes and modifications as reasonably and properly come within the scope of his contribution to the art.

I claim as my invention:

1. A detector for x-rays comprising:
    a gas-tight chamber containing a gas;
    a plurality of electrode plates disposed in said chamber for detecting ionization events arising due to interaction of x-rays with said gas, said electrode plates forming a plurality of detector cells, with each detector cell having two electrode plates disposed in a plane in succession in a propagation direction of said x-rays, each electrode plate generating a detector signal from which different spectral ranges of said x-rays are identified;

a plurality of spring contacts disposed in said chamber respectively electrically connected to said electrode plates for tapping said detector signals therefrom;

a conductor foil to which said spring contacts are electrically connected group-by-group, with a common conductor foil connecting each of the two electrode plates in each detector cell, said conductor foil having a plurality of conductor runs thereon, each conductor run having an electrically conductive projection; and a printed circuit board, carrying electrical components thereon for processing said detector signals, in electrical contact with said conductive projections of said conductor foil.

* * * * *